(12) United States Patent
Tan

(10) Patent No.: US 11,604,993 B1
(45) Date of Patent: Mar. 14, 2023

(54) MACHINE-LEARNING MODEL STRUCTURAL PRUNING

(71) Applicant: Zoox, Inc., Foster City, CA (US)

(72) Inventor: Qijun Tan, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 890 days.

(21) Appl. No.: 16/403,466

(22) Filed: May 3, 2019

(51) Int. Cl.
    *G06N 3/08*     (2006.01)
    *G06N 3/082*     (2023.01)
    *G06N 3/04*     (2023.01)
    *G06K 9/62*     (2022.01)
    *G06V 20/58*     (2022.01)

(52) U.S. Cl.
    CPC .......... *G06N 3/082* (2013.01); *G06K 9/6256* (2013.01); *G06N 3/04* (2013.01); *G06V 20/58* (2022.01)

(58) Field of Classification Search
    CPC .......... G06N 3/082; G06N 3/04; G06V 20/58; G06K 9/6256
    See application file for complete search history.

(56) References Cited

U.S. PATENT DOCUMENTS

2019/0114511 A1\* 4/2019 Gao ...................... G06N 7/005

OTHER PUBLICATIONS

Mauch et al., "Least-Squares Based Layerwise Pruning of Convolutional Neural Networks", 2018, 2018 IEEE Workshop on Statistical Signal Processing (SSP), pp. 60-64 (Year: 2018).\*

\* cited by examiner

*Primary Examiner* — Brent Johnston Hoover
(74) *Attorney, Agent, or Firm* — Lee & Hayes, P.C.

(57) ABSTRACT

Techniques for training a computationally-expensive layer, such as a convolutional layer, of a machine-learning model toward a target filter. If the training drives parameters associated with the layer to match or be close enough to the target filter, the layer may be removed, replace, and/or reduced in size, depending on the type of target filter used.

19 Claims, 5 Drawing Sheets

MACHINE-LEARNING MODEL STRUCTURAL PRUNING

BACKGROUND

Machine-learning (ML) models may be trained to perform various algorithms, such as to infer a truth, state, or condition from a data set. For example, an ML model may be trained to receive an image and classify objects in the image and/or identify where the objects are located with the image. Other ML models may be trained to determine a likelihood that a transaction is fraudulent, determine whether a cell is cancerous, predict the weather, convert audio to text, etc.

A machine-learning (ML) model, once trained, may comprise computationally expensive components that increase the time it takes for the ML model to output an inference and/or require processing bandwidth that exceeds processing budgeted for the ML model and/or otherwise available on computing device(s) running the ML model.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
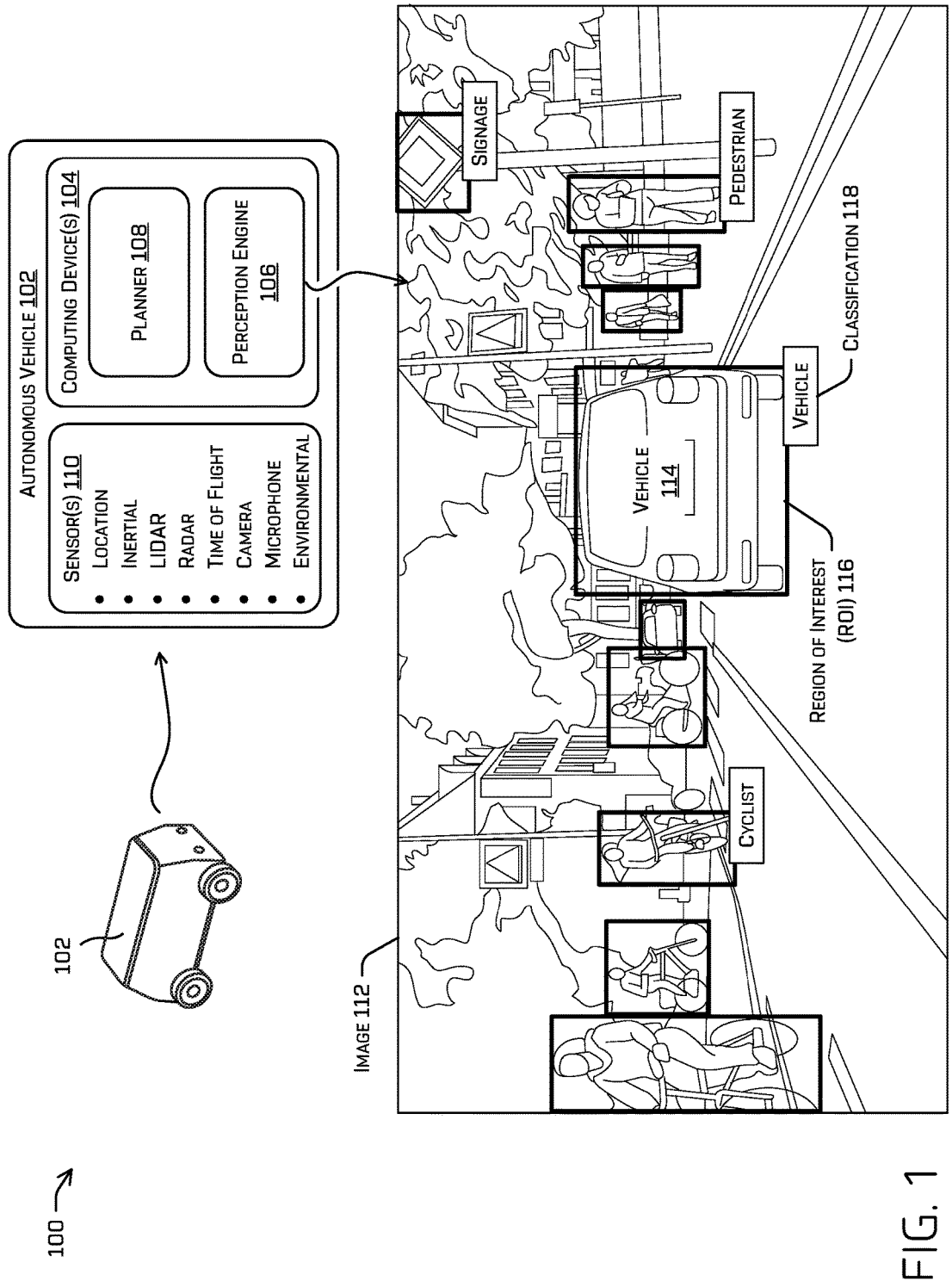
FIG. 1 illustrates an example scenario depicting an autonomous vehicle comprising one or more machine-learning (ML) models.

The techniques discussed herein may comprise training and/or pruning a machine-learning (ML) model by removing and/or replacing a layer of the ML model. In some examples, the ML model may comprise one or more layers such as, for example, convolutional layer(s), sub-sampling function(s) (e.g., maxpool layer(s)), rectified linear unit (ReLU) function(s), and/or the like. A convolutional layer of an ML model may comprise one or more filters. An output of a convolutional layer may comprise a convolution of one or more filters with one or more portions of an input thereto. In some examples, removing and/or replacing the layer of the ML model may be based at least in part on training the layer towards a target filter, which may specify a set of target parameters towards which the techniques discussed herein train the layer.

In some examples, training the ML model may comprise modifying parameter(s) (e.g., weights) associated with a filter of a convolutional layer to reduce a first error associated with an output of the ML model. For example, training the ML model using the first error (loss) may comprise training the ML model to accomplish a task, e.g., a classification task, a regression task, and/or the like. Training the ML model using the first loss may comprise determining a first loss based at least in part on an error between ground truth data and an output of the ML model and/or an output of the convolutional layer. For example, training a computer vision ML model may comprise receiving an output from the ML model (e.g., a region of interest (ROI) identifying a location of an object in an image, a classification of an object in an image), receiving a ground truth (e.g., a ground truth ROI that identifies the true location of the object within the image, a ground truth classification that identifies the true classification of the object), and modifying parameter(s) of a filter of a convolutional layer of the ML model based at least in part on reducing an error associated with the output of the ML model (e.g., a difference between the ROI and the ground truth ROI and/or a difference between the classification and the ground truth classification). In some examples, the first loss may comprise a loss for training the ML model to perform the function for which the ML model is being trained (e.g., object detection, object classification, object tracking, speech recognition).

The techniques discussed herein may additionally or alternatively comprise training one or more layers of an ML model towards a target filter. This may include determining a second loss based at least in part on a difference between target parameters associated with a target filter and parameters associated with a filter of a convolutional layer. For example, the target filter may identify a set of target weights towards which the training described herein modifies weights of the filter. The difference may comprise a loss calculated between the target weights and weights specified by the filter. In some examples, the techniques may comprise adjusting parameters associated with a filter of a convolutional layer based at least in part on the second loss (e.g., adjusting weights of the filter to reduce a magnitude of the second loss). This may functionally drive parameters associated with the filter towards the target parameters, which may be part of a pruning operation discussed in more detail herein. In some examples, the techniques may comprise adjusting parameters associated with the filter based at least in part on the first loss and/or the second loss.

In some examples, the target filters discussed herein may comprise a discretized Dirac function and/or any other function that, by convolving an input to the function, would result in an arithmetic permutation of the input and/or exhibit properties of a Dirac function. For example, a target filter may comprise an identity matrix, $\Delta_{id}$, (i.e., a matrix having values of 1 along a diagonal of the matrix, zero everywhere else); a "sum" matrix, $\Delta_{sum}$ (also referred to as a matrix of ones), having values of 1 everywhere within the matrix; and/or a "random" matrix, $\Delta_{random}$, having one and only one 1 in each column of the matrix. In some examples, the target matrices may comprise values other than 1 and 0 such as, -1, for example. Note that the terminologies "sum" matrix and the "random" matrix are so termed merely to identify matrices conforming to the rules specified herein, i.e., a sum matrix comprises ones everywhere within the matrix and a random matrix includes a 1 in each column of the random matrix and only one 1 in each column, and zeroes everywhere else in the matrix.

In some examples, the techniques may comprise using an identity matrix, sum matrix, and/or random matrix as the target filter when a number of inputs to a filter, n, equals a number of outputs from the filter, m. If the n does not equal m for a filter, the techniques may comprise using the sum matrix and/or the random matrix as the target filter.

A filter (or "kernel"), $K=(k_{ij})_{m \times n}$, of a convolutional layer, c, may receive an input, $$f = \begin{pmatrix} f_1 \\ \vdots \\ f_n \end{pmatrix}$$

and determine an output at the filter, K, by an element-wise convolution:

$$K * f = \begin{pmatrix} \sum_{j=1}^{n} k_{1j} * f_j \\ \vdots \\ \sum_{j=1}^{n} k_{mj} * f_j \end{pmatrix} \quad (1)$$

However, the convolutions indicated by equation (1) are equivalent to the following statements if the filter equals different ones of the target filters described above:

$$\text{if } K = \Delta_{id}, K * f = f \quad (2)$$

$$\text{if } K = \Delta_{sum}, K * f = \begin{pmatrix} \sum_{i=1}^{n} f_i \\ \vdots \\ \sum_{i=1}^{n} f_i \end{pmatrix} \quad (3)$$

$$\text{if } n = 3 \text{ and if } K = \Delta_{random} = \begin{bmatrix} 0 & 1 & 1 \\ 1 & 0 & 0 \end{bmatrix}, K * f = \begin{pmatrix} f_2 + f_3 \\ f_1 \end{pmatrix} \quad (4)$$

Equation (2) states that, if the filter of a convolutional layer is an identity matrix, then convolving the filter and the input will result in an output that is identical to the input. Equation (3) states that, if the filter is a sum matrix, then convolving the filter and the input will result in an output that is a vector having a same dimension as the input where each element thereof is equivalent to a summation of the input. Equation (4) states that, if there are three elements of the input and the filter is a random matrix as defined above (since there may be mn possible random matrices for a random matrix having m×n dimensions), then convolving the filter and the input will result in an output that is a vector having elements that are summations of portions of the input.

The techniques may additionally or alternatively comprise determining a third loss over one or more filters of a convolutional layer. In some examples, the third loss may comprise a sum of second losses calculated between individual ones of the one or more filters and a target filter. If the third loss is less than a loss threshold, the techniques may comprise removing the convolutional layer (e.g., by creating a "skip" connection that provides the outputs of a layer previous to the convolutional layer as input to a next layer after the convolutional layer, instead of to the convolutional layer) or replacing the convolutional layer with a linear transformation function or mapping.

For example, if the target filter comprised an identity matrix, the convolutional layer may be removed since convolution with an identity matrix results in an output identical to the input (see equation (2)). If the target filter comprised a sum matrix, the convolutional layer may be replaced with a function that outputs a vector comprising m summations of the inputs thereto (see equation (3)). If the target filter comprised a random matrix, the convolutional layer may be replaced with a function that outputs a summation according to a configuration of the random matrix (see equation (4)).

Since convolution is computationally expensive, skipping a convolutional layer or determining a number of summations (i.e., "pruning" a layer of the ML model), according to the techniques described herein, may lower a computing cost associated with running the ML model (e.g., it may require less time and/or processing resources to run the ML model and receive an output (inference) therefrom). The techniques described herein thereby modify a structure of the ML model by removing or replacing an entire convolutional layer. Other techniques that do not change a structure of the ML model (e.g., by removing a filter of the ML model without removing the entire layer in which the filter resides), achieve minimal improvements to reducing computational cost in comparison to the techniques discussed herein. Meanwhile, the techniques discussed herein may also maintain or improve an accuracy and/or recall rate of the ML model, even when the layer is pruned.

If the third loss meets or exceeds a loss threshold, the techniques may comprise continuing to train the convolutional layer or choosing a different convolutional layer to train toward the target layer. For example, the techniques may comprise tracking a training iteration count and selecting a different convolutional layer to train towards a target filter based at least in part on determining that the training iteration count meets a training iteration count threshold.

Example Scenario

FIG. 1 illustrates an example scenario 100 including an autonomous vehicle 102 comprising one or more ML models. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to ML models used in video games, manufacturing, augmented reality, etc.

The autonomous vehicle 102 may comprise computing device(s) 104 that may include one or more ML models. For example, the computing device(s) 104 may comprise a perception engine 106 and/or a planner 108, which may each comprise one or more ML models. The autonomous vehicle 102 may comprise more or less components that comprise ML model(s), but the perception engine 106 and/or planner 108 are given as a non-limiting example for the sake of comprehension.

In some examples, an ML model may comprise a neural network such as, for example, a convolutional neural network (CNN). As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters. Although discussed in the context of neural networks, any type of machine-learning can be used consistent with this disclosure.

In some examples, an ML model may comprise processor-executable instructions stored in a memory of the computing device(s) 104 and/or accessible thereto, hardware, and/or some combination thereof (e.g., a field-programmable gate array (FPGA), application-specific integrated circuit (ASIC)).

To further illustrate how the one or more ML models may be used by the autonomous vehicle 102, the autonomous vehicle 102 may receive sensor data from sensor(s) 110 of the autonomous vehicle 102. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated lidar and/or radar points, time of flight data, an image (or images), an audio signal, and/or other environmental signals, etc. For example, the autonomous vehicle 102 may receive image 112 from the sensor(s) 110. The depiction primarily discusses images/one or more computer vision ML models for ease, but it is contemplated that the techniques may be applied to ML models configured for any task.

In some examples, the perception engine 106 may include one or more ML models and/or other computer-executable instructions for detecting, identifying, segmenting, classifying, and/or tracking objects from sensor data collected from the environment of the autonomous vehicle 102. In some instances, the perception engine 106 may receive sensor data from sensor(s) 110 of the autonomous vehicle 102, determine perception data from the sensor data, and transmit the perception data to the planner 108 for use by the planner 108 to localize a position of the autonomous vehicle 102 on a global map and/or a local map, determine one or more trajectories, control motion of the autonomous vehicle 102 to traverse a path or route, and/or otherwise control operation of the autonomous vehicle 102, though any such operation may be performed in various other components (e.g., localization may be performed by a localization engine, not shown). In some instances, the perception data may comprise an ROI and/or a general classification associated with an object detected from sensor data by one or more ML models.

In the illustrated example, autonomous vehicle 102 may receive image 112 (and/or other sensor data), which includes a representation of a vehicle 114, multiple cyclists, multiple pedestrians, multiple signage objects, and a variety of different environmental objects (e.g., roadway, sidewalk, trees, buildings). An ML model of the perception engine 106 may generate an ROI 116 based at least in part on detecting vehicle 114 as being represented in image 112 according to the parameters of the ML model associated with components of the ML model by training. FIG. 1 additionally depicts multiple other ROIs that may be generated by the perception engine 106 for different objects that may be detected by the perception engine 106, but, for simplicity and clarity, they are not all labeled. For example, the other ROIs identify cyclists, another vehicle, and traffic signage, although it is understood that additional or alternative portions of an image (and/or other sensor data) may be detected by the perception engine 106.

In some examples, the perception engine 106 may additionally or alternatively determine, by an ML model, a classification of an object. For example, the ML model may be trained to output an indication of one classification, from among a plurality of general classifications, that corresponds with a highest probability determined by the ML model. In some examples, the classifications may include, for example, "cyclist," "vehicle," "pedestrian," "animal," "environmental object," etc., examples of which also appear in FIG. 1 such as classification 118, "vehicle."

In some instances, the perception engine 106 may transmit the ROI 116 and/or classification 118, as part of perception data, to the planner 108. The planner 108 may use perception data, including ROI 116 and/or classification 118, to generate instructions for controlling operation of the autonomous vehicle 102. For example, the planner 108 may comprise one or more ML models for determining a track to associate with an object detection; determining a route for the autonomous vehicle 102 from a first location to a second location; generating, substantially simultaneously, a plurality of potential trajectories for controlling motion of the autonomous vehicle 102 in accordance with a receding horizon technique (e.g., 1 micro-second, half a second, multiple seconds, etc.) and based at least in part on the perception data, to control the vehicle to traverse the route; and/or selecting one of the potential trajectories as a trajectory of the autonomous vehicle 102 that may be used to generate a drive control signal that may be transmitted to drive components of the autonomous vehicle 102.

Example ML Model Architecture

Figure 2:
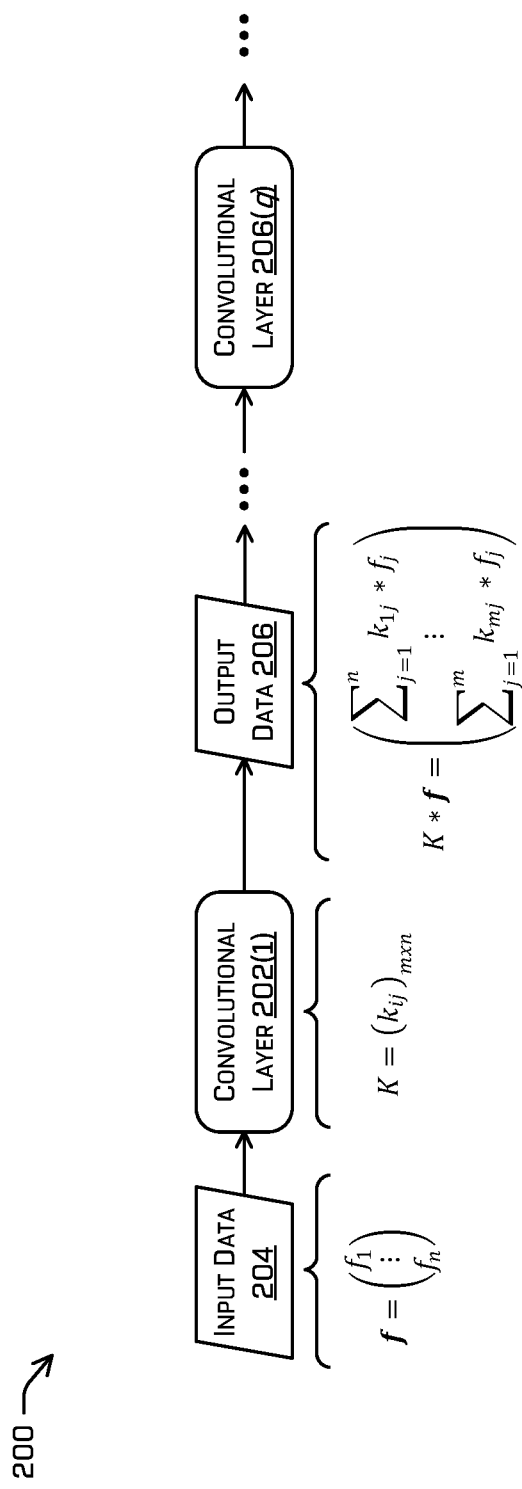
FIG. 2 illustrates a block diagram of an example architecture of an ML model comprising a convolutional layer.

FIG. 2 illustrates a block diagram of at least a portion of an example architecture of an example ML model 200 comprising one or more convolutional layers, convolutional layers 202(1)-(q). In some examples, the example ML model 200 may comprise additional or alternate layers such as, for example ReLU function(s), batch normalization(s), sub-sampling function(s) (e.g., maxpool, average pool, L2-norm), loss function(s)/feedback (at least during training), etc. In some examples, the example ML model 200 may comprise a neural network such as, for example, a convolutional network. Although discussed in the context of neural networks, any type of machine-learning may be used consistent with this disclosure. For example, machine-learning algorithms may include, but are not limited to, regression algorithms, instance-based algorithms, Bayesian algorithms, association rule learning algorithms, deep learning algorithms, etc. Additional or alternative examples of neural network architectures may include neural networks such as ResNet50, ResNet101, VGG, DenseNet, PointNet, and the like.

In some examples, the example ML model 200 may have a structure that defines the layers thereof and/or hyperparameters associated therewith. For example, the structure may define an order, type, and/or connectivity between components of the example ML model 200 (e.g., a first convolutional layer receives raw sensor data, generates output therefrom, and provides the output to a first maxpool function, which provides output to a second convolutional layer, and so on). Hyperparameters associated with a component of the example ML model 200 may define properties of the structure such as, for example, a number and/or dimension of filters within one of the convolutional layer(s) 202(1)-(q) and/or a spatial extent, stride, amount of zero padding, input size (e.g., tensor, having dimensions $W_1 \times H_1 \times D_1$, or any other number of dimensions) and/or type (e.g., raw sensor data, tensor received from a previous component of the example ML model 200), output size and/or type (e.g., tensor having dimensions having dimensions $W_1 \times H_1 \times D_1$ or $W_2 \times H_2 \times D_2$) and/or the like associated with a component of the example ML model 200.

A parameter, in contrast to a hyperparameter, may comprise any parameter that is modified during training such as, for example, a weight and/or bias associated with a layer or component(s) thereof, such as a filter.

In some examples, the example ML model 200 may receive sensor data from one or more sensors and/or any other type of data. Although convolutional layer 202(1) is depicted as being a first layer of the example ML model 200, the convolutional layer 202(1) may be a second or deeper layer of the example ML model 200.

In some examples, the techniques discussed herein may comprise removing or replacing at least one of the convolutional layer(s) 202(1)-($q$) based at least in part on the training techniques discussed herein. FIG. 2 illustrates example operation of a first convolutional layer 202(1), which could represent any convolutional layer of the example ML model 200.

Convolutional layer 202(1) may comprise one or more filters. A filter is represented herein as $K=(k_{ij})_{m \times n}$, which is a discretized representation of the filter. It is understood that the function of the filter may be represented in other domains, such as in time-domain, s-domain, and/or the like. A discretized representation of the filter may be represented as a matrix having m×n dimensions, where m and n are positive integers and where m is associated with a number of outputs from the filter (see equation (6)—the output tensor includes 1–m elements) and n is associated with a number of inputs to the filter. Note that i and j are respective row and column indexes of the filter, $k_{ij}$, having maximum values of m and n, respectively.

In some examples, a filter of a convolutional layer 202(1) may receive input data 204,$f$, which may be represented as a tensor of functions, $$f = \begin{pmatrix} f_1 \\ \vdots \\ f_n \end{pmatrix}.$$

In some examples, the input data 204 may comprise raw input data (e.g., if the convolutional layer is the first or one of the first layers and the input data to the ML model 200 has not yet been convolved and/or otherwise transformed besides data cleaning and/or normalization) and/or the functions of the input data 204 may represent operations conducted by previous components of the ML architecture (e.g., $f$ may comprise a feature map output by a previous layer). Although the discussion here attempts to explain the content of the input data 204, it is understood that the functions of $f$ may not be described in humanly-meaningful terms, as the functions may comprise an output that may be a computer and/or neural network transformation of the input thereto. As such, the functions may comprise a high-dimensional field of values generated by layer(s) of the respective components of the example ML model 200 (e.g., vectors and/or tensors of values representing intrinsic properties of the data determined based on the learned parameters).

Input data 204 may be provided to the convolutional layer 202(1) and the convolutional layer may convolve the input data 204 with one or more filters of the convolutional layer to determine output data 206. Output data 206 may comprise an m-dimensional tensor, since convolving $f$ and K results in an m-dimensional tensor. An m-th element of the output data 206 may calculated according to a summation of convolutions of respective elements of the input, $f_j$, with respective elements of the m-th row of the filter. Equation (1), as introduced above, is reproduced below:

$$K * f = \begin{pmatrix} \sum_{j=1}^{n} k_{1j} * f_j \\ \vdots \\ \sum_{j=1}^{n} k_{mj} * f_j \end{pmatrix} \tag{1}$$

In other words, $K*f$ may be an element-wise convolution of the input data 204 with respective a filter of the convolutional layer 202(1).

Example Process

Figure 3:
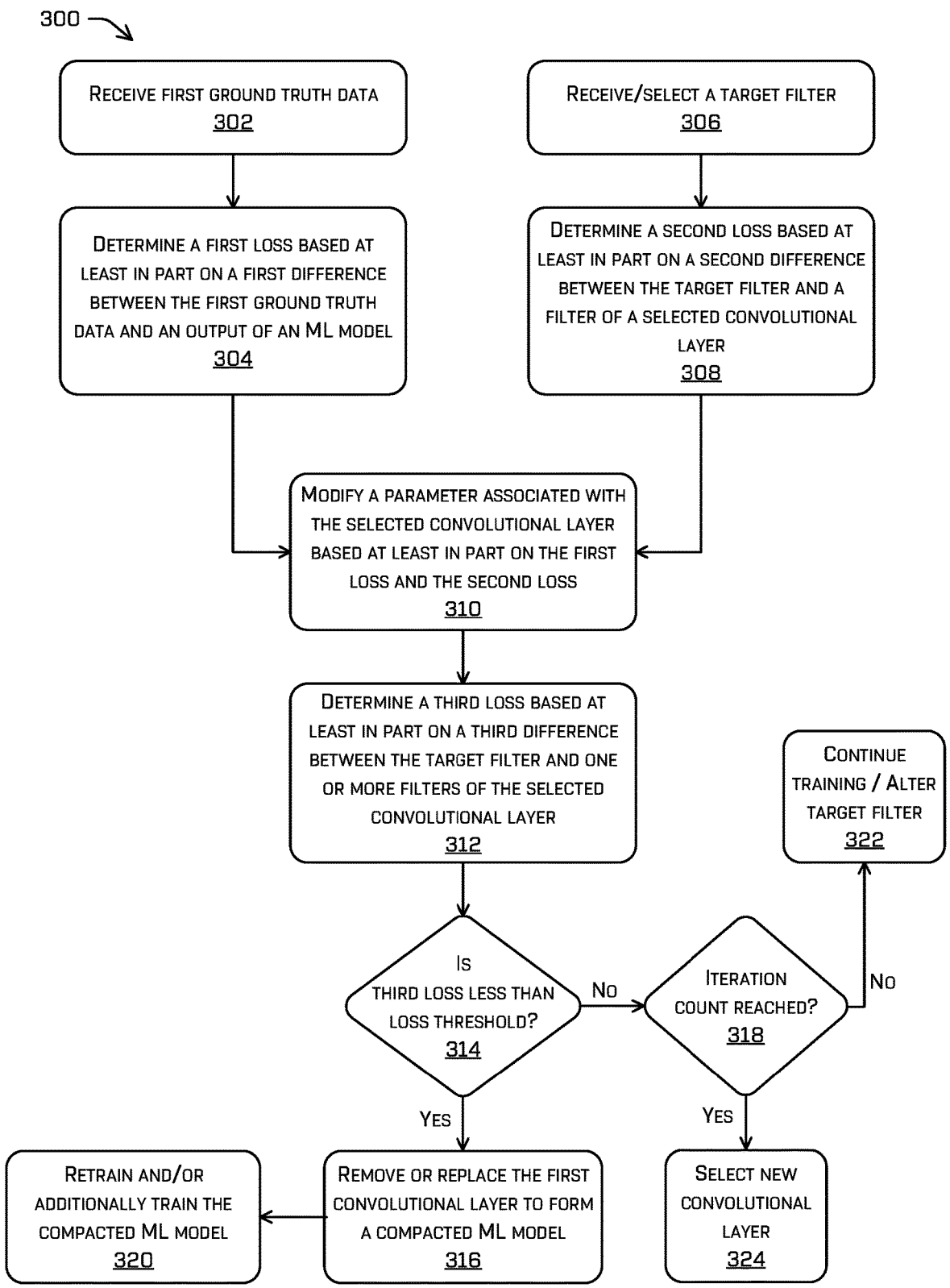
FIG. 3 illustrates a flow diagram of an example process for layer-pruning an ML model according to the techniques discussed herein.

FIG. 3 illustrates an example process 300 for training and/or pruning an ML model according to the techniques discussed herein. For example, the techniques may comprise training one or more filters (up to all of the filters) of a convolutional layer of an ML model toward a target filter and, if the one or more filters match or are close enough (generating an output associated with a loss that is less than a threshold loss) to the target filter, then the techniques may comprise removing the convolutional layer and/or replacing the convolutional layer with a simpler function such as, for example, an arithmetic and/or other linear transformation function.

At operation 302, example process 300 may comprise receiving first ground truth data, according to any of the techniques discussed herein. In some examples, operation 302 may additionally or alternatively comprise receiving an output from an ML model. The output may be associated with a task for which the ML model is being trained. For example, the output may comprise a classification of an object in an image, an ROI associated with image, a probability associated therewith, a likelihood that a cell is cancerous, a speech transcription, an embedding identifying a classification (e.g., a genre of a movie, an origin of a word, a type of an article of clothing), and/or the like. The ground truth may therefore be associated with the task for which the ML model is being trained, e.g., the ground truth may identify a location of an object in an image, whether a cell is cancerous, a true transcription of speech, and/or the like.

At operation 304, example process 300 may comprise determining a first loss based at least in part on a first difference between the first ground truth data and an output of the ML model, according to any of the techniques discussed herein. For example, determining the first loss may comprise determining a cross-entropy, Huber loss, mean absolute error ("L1 loss"), mean squared error ("L2 loss"), and/or the like between the first ground truth data and the output received from the ML model. The first loss may be a loss determined according to any suitable training technique for a regression, classification, or other task associated with the ML model.

At operation 306, example process 300 may comprise receiving and/or selecting a target filter, according to any of the techniques discussed herein. In some examples, operation 306 may additionally or alternatively comprise receiving an identification of a convolutional layer and/or selecting a convolutional layer to train toward a target kernel. For example, selecting a convolutional layer may comprise determining a third loss for one or more convolutional layers of an ML model and selecting a convolutional layer associated with a third loss that is less than a preliminary loss threshold and/or is a minimum third loss of the third losses calculated across the different convolutional layers. In an additional or alternate example, selecting the convolutional layer may comprise selecting a convolutional layer that is first, last, or in the middle of an order of one or more convolutional layers of the network; is associated with a greatest computational cost; is associated with a minimum computational cost; doesn't modify an input thereto by more than a threshold; and/or the like. In at least some examples, each and any convolutional layer may be targeted for such a process.

In some examples, the target filter may be selected from among an identity matrix, a sum matrix, a random matrix, and/or any other function that, by convolving an input to the function, would result in an arithmetic permutation of the input and/or exhibits properties of a Dirac function. In some examples, a target filter may be selected based at least in part on inputs to and/or outputs from the selected convolutional layer. For example, operation 306 may comprise selecting, as the target filter, an identity matrix, sum matrix, or random matrix if a number of inputs to a filter, n, equals a number of outputs from the filter, m. If the n does not equal m for a filter, operation 306 may comprise selecting, as the target matrix, a sum matrix and/or a random matrix.

In some examples, the target filters discussed herein may comprise a discretized Dirac function. For example, a target filter may comprise an identity matrix, $\Delta_{id}$, (i.e., a matrix having weights of 1 along a diagonal of the matrix, zero everywhere else); a "sum" matrix, $\Delta_{sum}$ having weights of 1 everywhere within the matrix; and/or a "random" matrix, $\Delta_{random}$, having one and only one 1 in each column of the matrix. In some examples, the target matrices may comprise values other than 1 and 0 such as, −1, for example. Note that the terminologies "sum" matrix and the "random" matrix are so termed merely to identify matrices conforming to the rules specified herein, i.e., a sum matrix comprises ones everywhere within the matrix and a random matrix includes a 1 in each column of the random matrix and only one 1 in each column, and zeroes everywhere else in the matrix.

In some examples, operation 306 may additionally or alternatively comprise generating a target filter based at least in part on the target filter selected. In some examples, the generating the target filter may be based at least in part on dimensions of a filter of the convolutional layer that is selected for training. Note that the dimensions of the filter may correspond to a number of inputs thereto and outputs therefrom. For example, operation 306 could comprise generating the following identity matrix for as the target filter for a filter having n=3 inputs and m=3 outputs (having dimensions/size of 3×3):

$$\Delta_{id} = \begin{matrix} 1 & 0 & 0 \\ 0 & 1 & 0 \\ 0 & 0 & 1 \end{matrix} \quad (5)$$

Given this example, the techniques described herein may include training the ML model such that the ML model increases in accuracy and/or recall for the task for which the ML model is to be trained while simultaneously driving a 3×3 a filter of the selected convolution towards having the values specified by a target filter, the identity matrix identified in equation 5 in this example.

Operation 306 could additionally or alternatively comprise generating the following sum matrix as the target filter for a filter having dimensions of 3×3:

$$\Delta_{sum} = \begin{matrix} 1 & 1 & 1 \\ 1 & 1 & 1 \\ 1 & 1 & 1 \end{matrix} \quad (6)$$

It is also understood that operation 306 may additionally or alternatively generate a random matrix for square-dimensioned filter.

Operation 306 could comprise generating the following sum matrix as the target filter for a filter having the dimensions 2×3:

$$\Delta_{sum} = \begin{matrix} 1 & 1 & 1 \\ 1 & 1 & 1 \end{matrix} \quad (7)$$

Operation 306 could comprise generating any of the following random matrices as the target filter for a filter having the dimensions 2×3:

$$\Delta_{random} = \begin{matrix} 0 & 1 & 1 \\ 1 & 0 & 0 \end{matrix} \quad (7)$$

$$\Delta_{random} = \begin{matrix} 0 & 0 & 1 \\ 1 & 1 & 0 \end{matrix} \quad (8)$$

$$\Delta_{random} = \begin{matrix} 1 & 0 & 1 \\ 0 & 1 & 0 \end{matrix} \quad (9)$$

It is understood that, although the example filters depicted above are represented as having sizes of 3×3 or 2×3, respectively, it is understood that the size of the target filter may be any size, number of dimensions, and/or may correspond on a number of inputs to and/or outputs from a filter. In some examples, the number of inputs to and/or outputs from a filter may be a hyperparameter defined as part of the ML model architecture. Since the inputs to and/or outputs from a filter may range from 1 up to hundreds or even thousands or more of outputs, the target filter may accordingly vary in size. Moreover, although three different "random" matrices are illustrated above, it is understood that, for a random matrix having m×n dimensions, where m and n are positive numbers (n corresponding to a number of inputs to the filter, m corresponding to a number of outputs from the filter), there may be mn possible random matrices (i.e., $2^3=8$, in the depicted example where the random matrix has a filter size of 2×3).

Convolving an input, ƒ, with one of the target filters described herein results in an output as indicated below:

$$\text{if } K = \Delta_{id}, K * f = f \quad (2)$$

$$\text{if } K = \Delta_{sum}, K * f = \begin{pmatrix} \sum_{i=1}^{n} f_i \\ \vdots \\ \sum_{i=1}^{n} f_i \end{pmatrix} \quad (3)$$

$$\text{if } n = 3 \text{ and if } K = \Delta_{random} = \begin{bmatrix} 0 & 1 & 1 \\ 1 & 0 & 0 \end{bmatrix}, K * f = \begin{pmatrix} f_2 + f_3 \\ f_1 \end{pmatrix} \quad (4)$$

At operation 308, example process 300 may comprise determining a second loss based at least in part on a second difference between the target filter and a filter of a selected convolutional layer, according to any of the techniques discussed herein. For example, the filter may comprise a matrix of values (weights and/or biases) that may differ from values of a target matrix. In some examples, determining the second loss may comprise determining an L1 loss, an L2 loss, and/or a normalized loss based on a difference between the filter and the target filter received and/or selected at operation 306. In at least some examples, such a loss may be determined element by element (e.g., performing an L2 loss between each element in the convolutional kernel and target filter), as described in equation 10 below. The second loss may be referred to as a "pruning loss", $\mathcal{L}_{SP}$, and operation 308 may determine the pruning loss for the selected convolutional layer, c, from among one or more convolutional layers, C, (i.e., c∈C), according to the following equation:

$$\mathcal{L}_{SP} = \sum_{c \in C} \sum_{i,j} \|\Delta_{ij} - k_{c,ij}\|_1 \tag{10}$$

$$\text{where } \Delta = (\Delta_{ij}) = \begin{cases} \Delta_{sum} \text{ or } \Delta_{rand} \text{ for } m \neq n \\ \Delta_{sum}, \Delta_{rand}, \text{ or } \Delta_{id} \text{ for } m = n \end{cases}; \tag{11}$$

$$K_c = k_{c,ij}; \text{ and} \tag{12}$$

$$\|M\|_1 = \sum_{i,j} |M_{ij}|. \tag{13}$$

In other words, the pruning loss, $\mathcal{L}_{SP}$, may be calculated for the selected convolutional layer based at least in part on a difference between a filter of the convolutional layer and the target filter. In the depicted example, determining the loss comprises determining a sum of the absolute value of the element-wise differences between each of the respective parameters of the filter and the target filter. In an additional or alternate example, operation 308 may comprise calculating a mean absolute error (L1 loss), mean squared error (L2 loss), a normalized loss, and/or any other suitable error indicating a quantitative difference between the filter and the target filter. In at least other examples, other definitions of such a loss may be used. As a non-limiting example, the loss may be defined as a trace of a product of the kernel with the inverse target filter divided by a normalizing factor (which may be the number of dimensions).

In some examples, the second loss may be weighted. In other words, parameters associated with a central portion of a filter may be weighted more heavily than exterior portions of a filter, such that a central portion of the filter may be changed more aggressively. For example, for a 5×5 filter, a central 3×3 portion may be weighted more heavily (e.g., the 3×3 portion occupied by 1's in equation 14 may be weighted more heavily that the portion occupied by 0's). In an additional or alternate example, a target filter may be "relaxed" by setting values of an exterior portion of the target filter to be zero. For example, a relaxed 5×5 sum filter may be represented as follows:

$$\Delta_{sum} = \begin{matrix} 0 & 0 & 0 & 0 & 0 \\ 0 & 1 & 1 & 1 & 0 \\ 0 & 1 & 1 & 1 & 0 \\ 0 & 1 & 1 & 1 & 0 \\ 0 & 0 & 0 & 0 & 0 \end{matrix} \tag{14}$$

At operation 310, example process 300 may comprise modifying a parameter associated with the selected convolutional layer based at least in part on the first loss and/or the second loss, according to any of the techniques discussed herein. Operation 310 may comprise modifying one or more weights and/or biases of a filter of the selected convolutional layer to reduce the first loss and/or the second loss (e.g., a summation of the first loss and the second loss). Modifying the one or more weights and/or biases of the filter may be part of regression, gradient descent, and/or other iterative loss backpropagation operation to reduce the first error and/or the second error that may be based at least in part on the first loss and/or the second loss.

At operation 312, example process 300 may comprise determining a third loss based at least in part on a third difference between the target filter and one or more filters of the selected convolutional layer, according to any of the techniques discussed herein. In some examples, example process 300 may conduct operation 312 after operation 310 (i.e., after the parameters associated with a filter have been modified) and/or example process 300 may conduct operation 312 as part of an operation for selecting a convolutional filter from among one or more convolutional filters of the ML model (e.g., which may be part of operation 306).

In some examples, the third loss calculation may be the same as the second loss calculation, i.e., a total error between the filter and the target filter. In an additional or alternate example, the third loss may be calculated per element of the filter and target filter as follows:

$$\mathcal{L}_{SP}(c,i,j) = \|\Delta_{ij} - k_{c,ij}\|_1 \tag{15}$$

In other words, operation 312 may comprise determining a third loss for up to each i and j of the target filter and filter.

At operation 314, example process 300 may comprise determining whether the third loss is less than a loss threshold, according to any of the techniques discussed herein. Put simply, operations 312 and 314 check to see whether the training the selected convolutional layer according to the description herein has driven parameters of the selected convolutional layer to be close enough to the target filter that removing or replacing the selected convolutional layer will not detrimentally affect the overall accuracy and/or recall of the ML model and/or, functionally, whether the selected convolutional layer matches the target filter or is close enough to the values of the target filter. If the third loss is less than the loss threshold (for all i and j, and/or for i or j), example process 300 may continue to operation 316. If the third loss is greater than the loss threshold, example process 300 may continue to operation 318.

At operation 316, example process 300 may comprise removing or replacing the selected convolutional layer, according to any of the techniques discussed herein. Operation 316 may be based at least in part on determining that the third loss is less than the loss threshold for all i, for all j, and/or for all i and j. For example, if the third loss is less than the loss threshold for all i and j, the filter has a same number of inputs and outputs (i.e., m=n), and the target filter was an identity matrix, operation 316 may comprise removing the selected convolutional layer (e.g., by providing input to a component following the selected convolutional layer instead of to the selected convolutional layer). If the third loss is less than the loss threshold for all i and j, the filter has a different number of inputs and outputs or a same number of inputs and outputs, and the target filter was a sum matrix or a random matrix, the selected convolutional layer may be replaced with a linear transformation function, such as an arithmetic function that calculates an output similar to Equation (3) or (4), respectively (e.g., the linear transformation function may determine a linear combination of inputs thereto). If the third loss is less than the loss threshold for all i or for all j, then operation 316 may comprise substituting the selected convolutional layer with a smaller convolutional layer, which may comprise substituting one or more filters of the original convolution layer with skip connection(s). By replacing, removing, and/or modifying the first convolutional layer, the ML model may effectively have a reduced size, processing cost, and/or processing run-time, so the resultant ML model having a removed, replaced, and/or modified first convolutional layer is referred to herein as a compacted ML model.

At operation 320, example process 300 may comprise retraining and/or additionally training the compacted ML model, according to any of the techniques discussed herein. For example, since the compacted ML model may have a different structure and/or components due to the replacing, removal, and/or modification accomplished at operation 316, retraining and/or additional training the compacted ML model may comprise modifying parameters of one or more other layers of the compacted ML model to reduce a newly calculated first loss (e.g., such as the loss determined at operation 304).

At operation 318, example process 300 may comprise determining whether an iteration count has been reached, according to any of the techniques discussed herein. For example, a gradient descent, regression, and/or other method may track a number of iterations of running the ML model and determining losses (e.g., first loss and/or second loss). In some examples, if a number of iterations meets an iteration threshold, operation 318 may continue to operation 320. If the number of iterations is less than the iteration threshold, operation 318 may continue to operation 322 and/or quit. In some examples, operation 318 may be additionally or alternatively accomplished at operation 310.

At operation 322, example process 300 may comprise continuing training and/or altering a target filter, according to any of the techniques discussed herein. For example, operations 302, 304, 308, 310, 312, 314, and/or 318 may be repeated based at least in part on a training iteration that may comprise running the ML model on the same or different training data. In an additional or alternate example, if a trend associated with the third loss stagnates (e.g., a rate associated with a reduction of the third loss over training iterations approaches zero) and the third loss still meets or exceeds the loss threshold, then operation 320 may alter the target filter, e.g., by picking a new type of target filter, such as by switching from a sum matrix to a random matrix. In some examples, operation 322 may additionally or alternatively comprise "relaxing" a target filter by altering values associated therewith (e.g., by setting one or more values of the target filter to 0, such as by setting exterior values to zero and/or weight or re-weighting the second loss function determination to drive a central portion of the filter towards the central values of the target filter more aggressively).

At operation 324, example process 300 may comprise selecting a new convolutional layer and/or terminating at least the pruning portion of the training (e.g., continuing to train the ML model using the first loss may continue), according to any of the techniques discussed herein. In some examples, one or more convolutional layers may be trained substantially at the same time according to the techniques discussed herein. For example, a second loss may be calculated for each convolutional layer which is selected for training. In some instances, if attempts (whether successful or not) have been made to replace and/or remove all of the convolutional layers have been made (or some other constraint has been satisfied) then the pruning portion of the training may be terminated.

Example process 300 may comprise more or less operations than those discussed herein and depicted in FIG. 3. Moreover, the operations may be conducted in a different order and/or the operations may be conducted in parallel (substantially simultaneously, in some instances) and/or in series.

Example Pruned ML Architecture

Figure 4A:
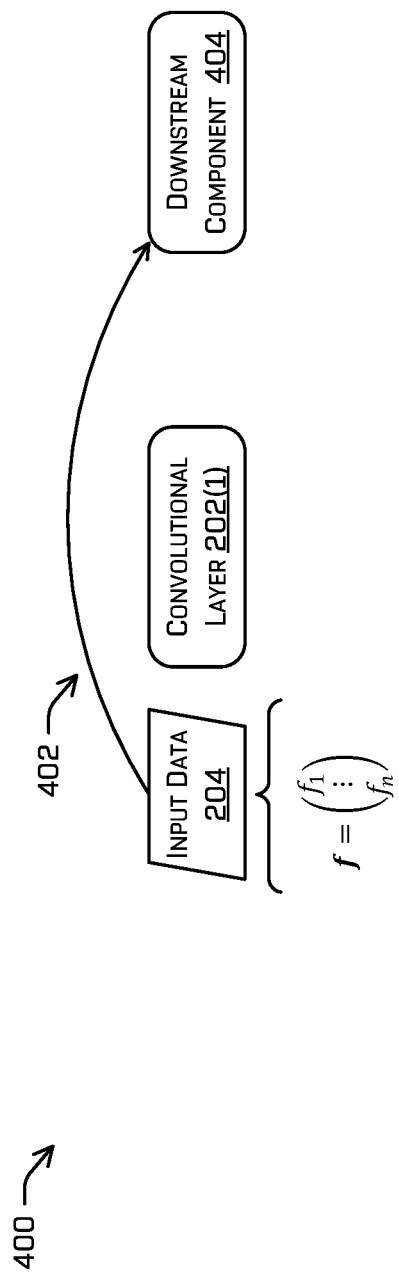
FIG. 4A illustrates a block diagram of an example architecture of an ML model where a convolutional layer thereof has been removed and/or skipped, based at least in part on training the convolutional layer toward a target filter.

FIG. 4A illustrates a block diagram of an example architecture 400 of an ML model where a convolutional layer thereof has been removed and/or skipped, based at least in part on training the convolutional layer toward a target filter. In some examples, the example architecture 400 may be the result of pruning example ML model 200, e.g., by training convolutional layer 202(1) toward a target filter, such as an identity matrix. Pruning example ML model 200 may comprise removing convolutional layer 202(1), e.g., by creating a skip connection example architecture 400 may comprise a skip connection 402 between a component previous to the convolutional layer 202(1) and a downstream component 404 (e.g., a subsequent convolutional layer) subsequent to the convolutional layer 202(1) in the example ML model 200 structure. In some examples, the skip connection may comprise providing input data 204 to the downstream component 404 instead of the convolutional layer 202(1).

Figure 4B:
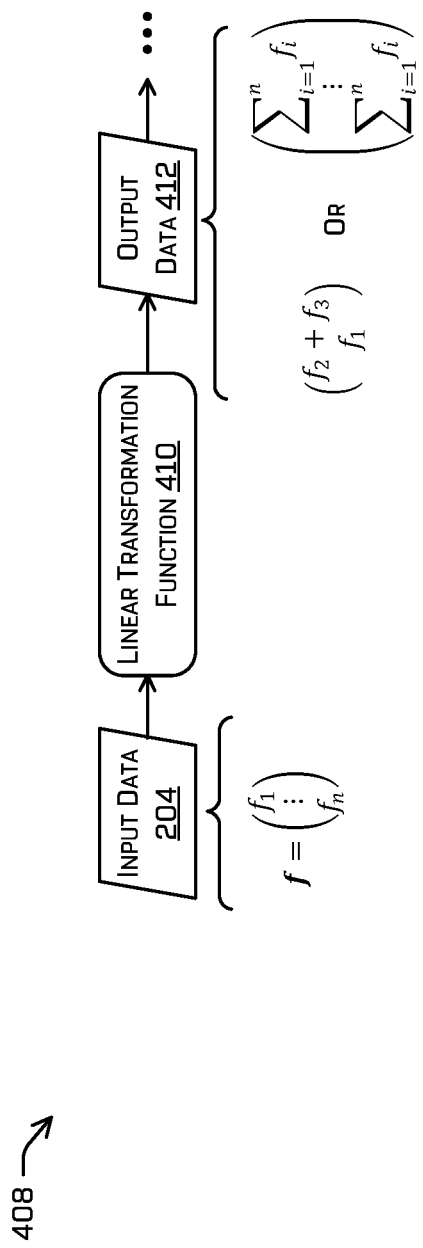
FIG. 4B illustrates a block diagram of an example architecture of an ML model where a convolutional layer thereof has been replaced by a linear transformation function, based at least in part on training the convolutional layer toward a target filter.

FIG. 4B illustrates a block diagram of an example architecture 408 of an ML model where a convolutional layer thereof has been replaced by a linear transformation function, based at least in part on training the convolutional layer toward a target filter. In some examples, the example architecture 400 may be the result of pruning example ML model 200, e.g., by training convolutional layer 202(1) toward a target filter, such as a sum matrix and/or a random matrix. Pruning example ML model 200 may comprise replacing convolutional layer 202(1) with alinear transformation function 410, which may generate output data 412 based at least in part on the input data 204 according to Equation (3) or (4), for example, which may represent an arithmetic computation equivalent to convolving input data with a target filter.

In some examples, removing and/or replacing a convolutional filter may comprise a combination of the techniques illustrated in FIGS. 4A and 4B, e.g., the convolutional layer 202(1) may be replaced with a linear transformation function 4xx and/or a skip connection may be inserted into the structure of example ML model 200.

Example System

Figure 5:
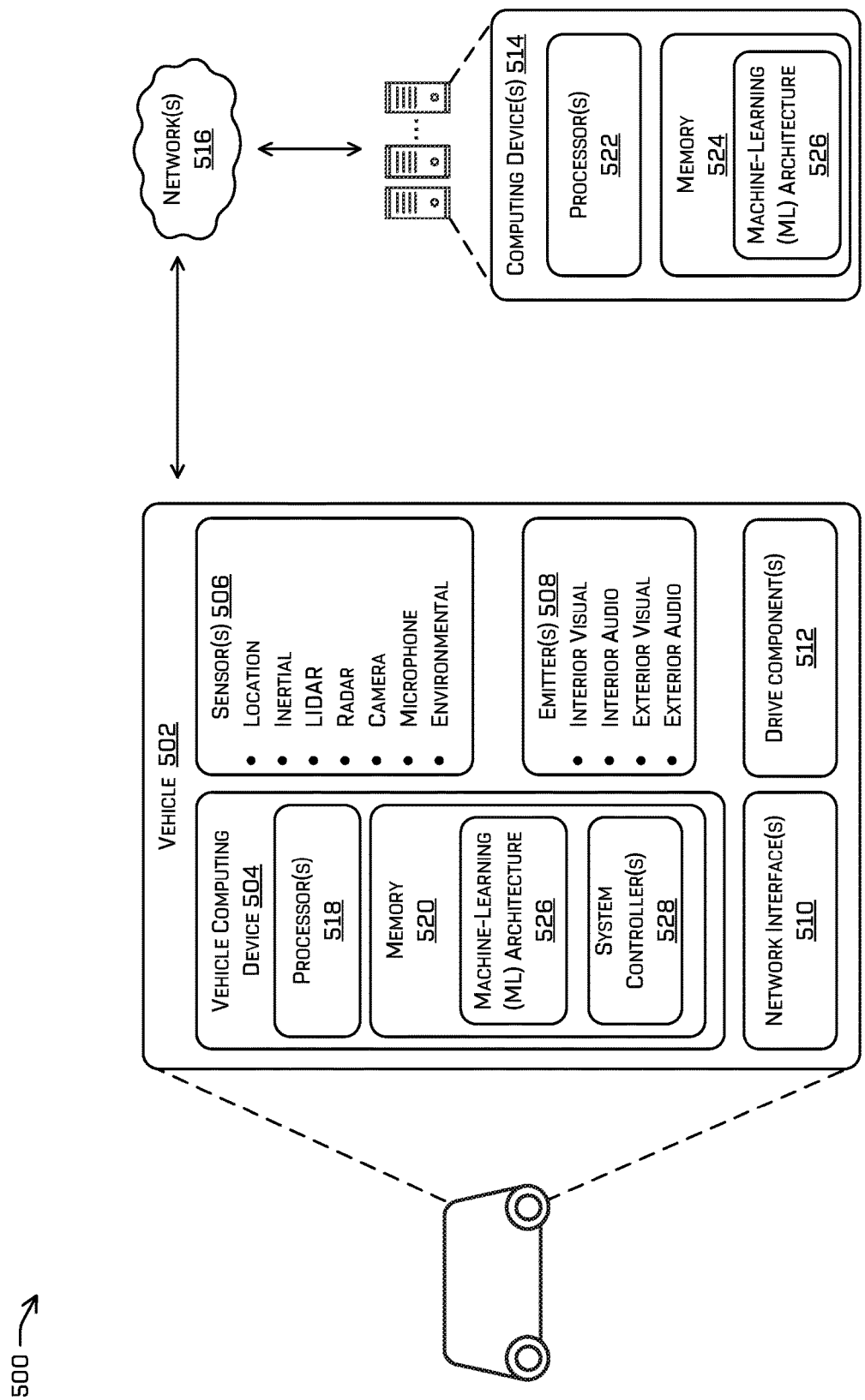
FIG. 5 illustrates a block diagram of an example system for training, layer-pruning, and/or using a layer-pruned ML model.

FIG. 5 illustrates a block diagram of an example system that implements the techniques discussed herein. In some instances, the system 500 may include a vehicle 502, which may correspond to the autonomous vehicle 102 in FIG. 1. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification. Moreover, in some instances, the techniques described herein may be usable by non-autonomous vehicles as well. It is contemplated that the techniques discussed herein may apply to more than robotic control, such as for autonomous vehicles. For example, the techniques discussed herein may be applied to video games, manufacturing, augmented reality, etc.

The vehicle 502 may include a vehicle computing device 504, one or more sensor(s) 506, one or more emitters 508, one or more network interfaces 510, and/or one or more drive components 512. In some instances, vehicle computing device 504 may represent computing device(s) 104 and/or sensor(s) 506 may represent sensor(s) 110.

In some instances, the sensor(s) 506 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) 506 may include multiple instances of each of these or other types of sensors. For instance, the lidar sensors may include individual lidar sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device 504.

The vehicle 502 may also include emitter(s) 508 for emitting light and/or sound. The emitter(s) 508 in this example may include interior audio and visual emitter(s) to communicate with passengers of the vehicle 502. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 508 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 502 may also include network interface(s) 510 that enable communication between the vehicle 502 and one or more other local or remote computing device(s). For instance, the network interface(s) 510 may facilitate communication with other local computing device(s) on the vehicle 502 and/or the drive component(s) 512. Also, the network interface (s) 510 may additionally or alternatively allow the vehicle to communicate with other nearby computing device(s) (e.g., other nearby vehicles, traffic signals, etc.). The network interface(s) 510 may additionally or alternatively enable the vehicle 502 to communicate with a computing device(s) 514. In some examples, computing device(s) 514 may comprise one or more nodes of a distributed computing system (e.g., a cloud computing architecture).

The network interface(s) 510 may include physical and/or logical interfaces for connecting the vehicle computing device 504 to another computing device or a network, such as network(s) 516. For example, the network interface(s) 510 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device 504 and/or the sensor(s) 506 may send sensor data, via the network(s) 516, to the computing device(s) 514 at a particular frequency, after a lapse of a predetermined period of time, in near real-time, etc.

In some instances, the vehicle 502 may include one or more drive components 512. In some instances, the vehicle 502 may have a single drive component 512. In some instances, the drive component(s) 512 may include one or more sensors to detect conditions of the drive component(s) 512 and/or the surroundings of the vehicle 502. By way of example and not limitation, the sensor(s) of the drive component(s) 512 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 512. In some cases, the sensor(s) on the drive component(s) 512 may overlap or supplement corresponding systems of the vehicle 502 (e.g., sensor(s) 506).

The drive component(s) 512 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 512 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 512. Furthermore, the drive component(s) 512 may also include one or more communication connection(s) that enable communication by the respective drive component with one or more other local or remote computing device(s).

The vehicle computing device 504 may include one or more processors, processor(s) 518, and memory 520 communicatively coupled with the one or more processors 518. Computing device(s) 514 may additionally or alternatively include processor(s) 522, and/or memory 524. The processor(s) 518 and/or 522 may be any suitable processor capable of executing instructions to process data and perform operations as described herein. By way of example and not limitation, the processor(s) 518 and/or 522 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 520 and/or 524 may be examples of non-transitory computer-readable media. The memory 520 and/or 524 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 520 and/or memory 524 may store an ML architecture 526 representative of at least one of one or more ML models of the vehicle computing device 504. ML architecture 526 may include and/or represent an ML model of perception engine 106 and/or planner 108 (or any other system of the vehicle 502 comprising an ML model), example ML model 200, example architecture 400, and/or example architecture 408.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

Memory 520 may additionally or alternatively store one or more system controller(s) 528 (which may additionally or alternatively be implemented as hardware), which may be configured to control steering, propulsion, braking, safety, emitters, communication, and other systems of the vehicle 502. These system controller(s) 528 may communicate with and/or control corresponding systems of the drive component(s) 512 and/or other components of the vehicle 502. For example, a planner may generate instructions for controlling vehicle 502 based at least in part on an output of ML architecture 526 and transmit the instructions to the system controller(s) 528, which may control operation of the vehicle 502 based at least in part on the instructions.

It should be noted that while FIG. 5 is illustrated as a distributed system, in alternative examples, components of the vehicle 502 may be associated with the computing device(s) 514 and/or components of the computing device(s) 514 may be associated with the vehicle 502. That is, the vehicle 502 may perform one or more of the functions associated with the computing device(s) 514, and vice versa.

Example Clauses

A. A method comprising: training a neural network comprising at least a convolutional layer, wherein the training comprises: receiving first ground truth data; determining a first loss based at least in part on a first difference between the first ground truth data and an output of at least one of the convolutional layer or the neural network; receiving a target filter, the target filter comprising at least one of an identity matrix, a random matrix, or a matrix of ones; determining a second loss based at least in part on a second difference between the target filter and a filter of the convolutional layer; modifying, as a modified filter, a parameter associated with the filter based at least in part on the first loss and the second loss; determining a third loss based at least in part on a third difference between the target filter and the modified filter; and based at least in part on determining that the third loss does not meet a loss threshold, at least one of removing the convolutional layer from the neural network, creating a skip connection in the neural network to bypass the convolutional layer, or replacing the convolutional layer with a linear transformation function.

B. The method of paragraph A, wherein removing the convolutional layer is based at least in part on the target filter comprising the identity matrix.

C. The method of either paragraph A or B, wherein skipping the convolutional layer and replacing the convolutional layer with the linear transformation function is based at least in part on the target filter comprising at least one of the random matrix or the matrix of ones.

D. The method of any one of paragraphs A-C, further comprising retraining the neural network with the convolutional layer removed, replaced, or modified with the skip connection.

E. The method of any one of paragraphs A-D, further comprising controlling an autonomous vehicle based at least in part on a second output of the neural network with the convolutional layer removed or replaced.

F. A system comprising: one or more processors; and a memory storing processor-executable instructions that, when executed by the one or more processors, cause the system to perform operations comprising: training a machine-learning (ML) model comprising at least a convolutional layer, wherein the training comprises: receiving first ground truth data; determining a first loss based at least in part on a first difference between the first ground truth data and an output of at least the convolutional layer; receiving a target filter; determining a second loss based at least in part on a second difference between the target filter and a filter of the convolutional layer; modifying, as a modified filter, a parameter associated with the filter based at least in part on the first loss and the second loss; and determining a third loss based at least in part on a third difference between the target filter and the modified filter.

G. The system of paragraph F, wherein the operations further comprise: based at least in part on determining that the third loss does not meet a loss threshold, at least one of removing the convolutional layer from the ML model, creating a skip connection in the ML model to bypass the convolutional layer, or replacing the convolutional layer with a linear transformation function.

H. The system of either paragraph F or G, wherein the operations further comprise continuing to train the ML model based at least in part on determining that the third loss meets or exceeds a loss threshold.

I. The system of any one of paragraphs F-H, wherein the target filter comprises at least one of an identity matrix, a random matrix, or a matrix of ones.

J. The system of any one of paragraphs F-G, wherein removing the convolutional layer is based at least in part on the target filter comprising an identity matrix.

K. The system of any one of paragraphs F-J, wherein skipping the convolutional layer and replacing the convolutional layer with the linear transformation function is based at least in part on the target filter comprising a random matrix or a matrix of ones.

L. The system of any one of paragraphs F-K, wherein the linear transformation function comprises a linear combination of inputs thereto.

M. The system of any one of paragraphs F-L, wherein the operations further comprise training the neural network with the convolutional layer removed, replaced, or modified with the skip connection.

N. A non-transitory computer-readable medium storing processor-executable instructions that, when executed by one or more processors, cause the one or more processors to perform operations comprising: training a machine-learning (ML) model comprising at least a convolutional layer, wherein the training comprises: receiving first ground truth data; determining a first loss based at least in part on a first difference between the first ground truth data and an output of at least a convolutional layer; receiving a target filter; determining a second loss based at least in part on a second difference between the target filter and a filter of the convolutional layer; modifying, as a modified filter, a parameter associated with the filter based at least in part on the first loss and the second loss; and determining a third loss based at least in part on a third difference between the target filter and the modified filter.

O. The non-transitory computer-readable medium of paragraph N, wherein the operations further comprise: based at least in part on determining that the third loss does not meet a loss threshold, at least one of removing the convolutional layer from the ML model, creating a skip connection in the ML model to bypass the convolutional layer, or replacing the convolutional layer with a linear transformation function.

P. The non-transitory computer-readable medium of either paragraph N or O, wherein the operations further comprise continuing to train the ML model based at least in part on determining that the third loss meets or exceeds a loss threshold.

Q. The non-transitory computer-readable medium of any one of paragraphs N-P, wherein the target filter comprises an identity matrix, a random matrix, or a matrix of ones.

R. The non-transitory computer-readable medium of paragraph O, wherein removing the convolutional layer is based at least in part on the target filter comprising an identity matrix.

S. The non-transitory computer-readable medium of any one of paragraphs N-R, wherein skipping the convolutional layer and replacing the convolutional layer with the linear transformation function is based at least in part on the target filter comprising a random matrix or a matrix of ones.

T. The non-transitory computer-readable medium of any one of paragraphs N-S, further comprising training the neural network with the convolutional layer removed, replaced, or modified with the skip connection.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
    training a neural network comprising at least a convolutional layer, wherein the training comprises:
    receiving first ground truth data;
    determining a first loss based at least in part on a first difference between the first ground truth data and an output of at least one of the convolutional layer or the neural network;
    receiving a target filter, the target filter comprising at least one of an identity matrix, a random matrix, or a matrix of ones;
    determining a second loss based at least in part on a second difference between the target filter and a filter of the convolutional layer;
    modifying, as a modified filter, a parameter associated with the filter of the convolutional layer based at least in part on the first loss and the second loss;
    determining a third loss based at least in part on a third difference between the target filter and the modified filter; and
    based at least in part on determining that the third loss does not meet a loss threshold, at least one of removing the convolutional layer from the neural network, creating a skip connection in the neural network to bypass the convolutional layer, or replacing the convolutional layer with a linear transformation function.

2. The method of claim 1, wherein removing the convolutional layer is based at least in part on the target filter comprising the identity matrix.

3. The method of claim 1, wherein skipping the convolutional layer and replacing the convolutional layer with the linear transformation function is based at least in part on the target filter comprising at least one of the random matrix or the matrix of ones.

4. The method of claim 1, further comprising retraining the neural network with the convolutional layer removed, replaced, or modified with the skip connection.

5. The method of claim 1, further comprising controlling an autonomous vehicle based at least in part on a second output of the neural network with the convolutional layer removed or replaced.

6. The method of claim 1, further comprising altering the target filter based at least in part on determining that at least one of the third loss meets or exceeds the loss threshold, a number of iterations of training meets or exceeds a threshold number of iteration, or a reduction of the third loss over two or more training iterations does not meet a threshold difference.

7. A system comprising:
    one or more processors; and
    a memory storing processor-executable instructions that, when executed by the one or more processors, cause the system to perform operations comprising:
    training a machine-learning (ML) model comprising at least a convolutional layer, wherein the training comprises:
    receiving first ground truth data;
    determining a first loss based at least in part on a first difference between the first ground truth data and an output of at least the convolutional layer;
    receiving a target filter, wherein the target filter comprises at least one of an identity matrix, a random matrix, or a matrix of ones;
    determining a second loss based at least in part on a second difference between the target filter and a filter of the convolutional layer;
    modifying, as a modified filter, a parameter associated with the filter of the convolutional layer based at least in part on the first loss and the second loss;
    determining a third loss based at least in part on a third difference between the target filter and the modified filter; and
    based at least in part on determining that the third loss does not meet a loss threshold, at least one of removing the convolutional layer from the ML model, creating a skip connection in the ML model to bypass the convolutional layer, or replacing the convolutional layer with a linear transformation function.

8. The system of claim 7, wherein the operations further comprise continuing to train the ML model based at least in part on determining that the third loss meets or exceeds a loss threshold.

9. The system of claim 7, wherein removing the convolutional layer is based at least in part on the target filter comprising an identity matrix.

10. The system of claim 7, wherein skipping the convolutional layer and replacing the convolutional layer with the linear transformation function is based at least in part on the target filter comprising a random matrix or a matrix of ones.

11. The system of claim 7, wherein the linear transformation function comprises a linear combination of inputs thereto.

12. The system of claim 7, wherein the operations further comprise training the neural network with the convolutional layer removed, replaced, or modified with the skip connection.

13. The system of claim 7, wherein the operations further comprise altering the target filter based at least in part on determining that at least one of the third loss meets or exceeds the loss threshold, a number of iterations of training meets or exceeds a threshold number of iteration, or a reduction of the third loss over two or more training iterations does not meet a threshold difference.

14. A non-transitory computer-readable medium storing processor-executable instructions that, when executed by one or more processors, cause the one or more processors to perform operations comprising:
    training a machine-learning (ML) model comprising at least a convolutional layer, wherein the training comprises:
    receiving first ground truth data;
    determining a first loss based at least in part on a first difference between the first ground truth data and an output of at least a convolutional layer;
    receiving a target filter, wherein the target filter comprises an identity matrix, a random matrix, or a matrix of ones;
    determining a second loss based at least in part on a second difference between the target filter and a filter of the convolutional layer;
    modifying, as a modified filter, a parameter associated with the filter of the convolutional layer based at least in part on the first loss and the second loss;
    determining a third loss based at least in part on a third difference between the target filter and the modified filter; and
    based at least in part on determining that the third loss does not meet a loss threshold, at least one of removing the convolutional layer from the ML model, creating a skip connection in the ML model to bypass the convolutional layer, or replacing the convolutional layer with a linear transformation function.

15. The non-transitory computer-readable medium of claim 14, wherein the operations further comprise continuing to train the ML model based at least in part on determining that the third loss meets or exceeds a loss threshold.

16. The non-transitory computer-readable medium of claim 14, wherein removing the convolutional layer is based at least in part on the target filter comprising an identity matrix.

17. The non-transitory computer-readable medium of claim 14, wherein skipping the convolutional layer and replacing the convolutional layer with the linear transformation function is based at least in part on the target filter comprising a random matrix or a matrix of ones.

18. The non-transitory computer-readable medium of claim 14, further comprising training the neural network with the convolutional layer removed, replaced, or modified with the skip connection.

19. The non-transitory computer-readable medium of claim 14, wherein the operations further comprise altering the target filter based at least in part on determining that at least one of the third loss meets or exceeds the loss threshold, a number of iterations of training meets or exceeds a threshold number of iteration, or a reduction of the third loss over two or more training iterations does not meet a threshold difference.

* * * * *